Patented Feb. 4, 1936

2,029,836

UNITED STATES PATENT OFFICE 2,029,836

MOLDING COMPOSITION AND MOLDED ARTICLES MADE THEREFROM

Kurt Ripper, Vienna, Austria

No Drawing. Application September 27, 1929, Serial No. 395,750. In Austria October 17, 1928

17 Claims. (Cl. 260—3)

This invention relates to a molding powder or composition containing fibres and a binding material consisting of mixed condensation products of thiourea and urea with formaldehyde, with or without the addition of fillers.

My invention consists substantially in using as the binding medium mixed resins possessing the characteristic behaviour of hydrophobe colloids such as they are produced by condensation of thiourea and urea with formaldehyde in strongly acid solution.

These mixed condensation products separate spontaneously from the bulk of the water introduced with the starting materials and formed in the course of the reaction, and are adapted to be freed very easily from the small percentage of remaining water which is retained in an exceedingly loose manner. Furthermore they show in spite of their hydrophobe nature the desirable property of forming sols quite stable while hot. Consequently in using the said mixed condensation products as binding agents, molding compositions can be obtained by a very simple process, this object being attained by introducing the fibres immediately into the generated hot acid reaction solution (representing the sol of the formed mixed condensation products) and by heating the mixture until the condensation products have reached the desired state of polymerisation; meanwhile the mixture has become dry to such a degree that it can be ground. Thus the chemical process of polymerisation is completed to a very great extent and in a very uniform manner in the preparatory stages, and the hot pressing is used substantially only for mechanical shaping. Moreover, the completion of the polymerisation during the molding—if at all required—is assisted and accelerated by the presence of the acid condensing agent.

The hydrophobe mixed thiourea and urea condensation products made according to the invention, may, however, be worked up into molding compositions quite as well by any other of the known methods employed for the production of such compositions from fibers and a natural or artificial resinous binding material. The molding compositions produced in that way give, when molded at a suitably high pressure for a very short period, white or transparent molded articles which are fast to light and comply with severe conditions also in other respects, without it being necessary to cool the molds.

The process for the manufacture of the mixed resins used according to the invention as the binding medium, consists substantially in reacting with formaldehyde under the influence of heat upon thiourea and urea in combination in an acid solution of a higher hydrogen ion concentration than that corresponding to the value pH=5, preferably at a pH=3, the formaldehyde being present in a smaller proportion than would correspond to 4 molecules of formaldehyde to the sum of 2 molecules of thiourea and urea. Preferably the formaldehyde is employed in a ratio of 3 molecules to the sum of 2 molecules of thiourea and urea. The condensation is conducted by heating to a stage at which from a sample of the obtained condensation solution a hydrophobe condensation product separates on cooling.

The mixed thiourea and urea condensation products are obtained either by simultaneously or by subsequently introducing the two starting materials (urea and thiourea) into the reaction with formaldehyde, but they cannot be made by separately condensing the two starting materials with formaldehyde and mixing the resulting condensation products together.

In condensing urea alone with formaldehyde under the influence of heat with the foregoing hydrogen ion concentrations and molecular proportions of the reaction components, there would be produced, even after a short heating, reaction mixtures which gelatinize and harden to a white mass incapable of being molded. In contrast thereto a mixture of urea and thiourea, quite unexpectedly, can be condensed with formaldehyde in an acid medium corresponding to pH less than 5 with a proportion of 1½ mols formaldehyde to 1 mol urea to resins forming sols stable white hot, which can be converted by admixture with fibres into excellent powders for quick molding. The best results are obtained by adjusting the proportion of formaldehyde and thiourea corresponding to 1½ mols of formaldehyde to 1 mol of thiourea and by composing the mixed resin from 1 mol thiourea to 1 mol urea.

A hitherto unknown white or strongly clouded resin which can be converted into an opaque molded mass, is produced by the following method of carrying out the process according to the invention:

To the reaction solution, produced by a short boiling from a solution of urea and formaldehyde in the proportion of 1½ mols formaldehyde to 1 mol urea, with a higher hydrogen ion concentration than that corresponding to the value pH=5, a solution of thiourea and formaldehyde is added in the proportion of 1½ mols formaldehyde to 1 mol thiourea. The reaction mixture is heated until a white or opaque solution of a mixed resin is formed. The reaction mixture, at this stage is a liquid, which while hot retains its liquid condition. This hot liquid cannot be diluted with either hot or cold water without causing precipitation of the resin from the solution. On cooling this solution, the resin is precipitated.

In order to obtain a binding medium which gives transparent molded products, the process is carried out by dissolving thiourea in hot formaldehyde in the proportion of 3 mols formaldehyde to 1 mol thiourea, whereupon 1 mol urea is added to the boiling solution at a higher hydrogen ion concentration than that corresponding to a pH value of 5. This mixture which contrary to expectations remains as clear as water, is boiled in a boiler with a reflux condenser until there is formed a water-clear solution of a mixed resin, which solution is imiscible with water, but which remains a clear liquid while hot.

The resin solution, either white or clear, prepared by one or the other method above described, is thereupon thoroughly mixed with fibres on an efficient kneading apparatus, without changing the hydrogen ion concentration and without addition of formaldehyde binding agents.

After the mixture is air dried, it is heated, preferably at a temperature between 90–100° C., with or without the use of mechanical auxiliary devices (rotating drum, heated rolls or the like), if necessary in a vacuum, then ground and then subjected to a final heat treatment, until a sample taken, while exhibiting in the hot press the necessary flowing qualities, leaves the press free from blisters after a very short molding time and without cooling of the mold being necessary. It has been found that a very small percentage of water must be left in the mixture for the purpose of ensuring the flowing in the press of these molding compositions which contain such highly polymerised products of condensation. This state is reached when the proportion of water has dropped to such an extent that a sample of the powder, when further heated at a temperature of nearly 100°, loses only about 5% in weight.

The greatest simplification of the method of working can be attained by causing the formation of the mixed condensation products to take place in the fibres themselves, so that the quick molding composition is produced in one single operation. For this purpose the fibrous substances are impregnated preferably with a suitably acidified solution of 1 mol urea and 1 mol thiourea in 3 mols formaldehyde and thereupon heated in a closed vessel with strong agitation until the mixed resin is produced. The remainder of the process takes place in the manner already described.

As fibrous substances may be used cellulose, for example, cotton, or a cellulose derivative, such as artificial silk, asbestos and the like. The addition of asbestos substantially increases resistance to heat and safety against ignition.

The powders can be colored with organic dyestuffs or with pigments at any desired stage of the manufacture. Fillers and extenders may be added and in order to improve the molding operation, small quantities of mold lubricants may be used.

The molding of the powders manufactured by the described special methods of carrying out the process according to the invention, requires almost the same time as that of the known molding compositions of the phenol-formaldehyde type adapted to be very rapidly molded to shape. With a specific pressure of 150–300 kg. per sq. cm. and with a curing time of about one minute, it is possible to obtain in the hot-press molded pieces of 3 mm. thickness of wall which are excellent dielectrics. It is preferable to submit the molded material to an additional drying of about 12 to 20 hours, if possible exposed to a slow current of air or under slightly reduced pressure, at a temperature of 80 to 100° C. The molding temperature is about 140° C. at the surface of the die.

As not only the time required for curing, but also the molding temperature is similar to the working conditions of phenol-formaldehyde molding compositions made especially for being rapidly molded, the material described can by molding be united with such phenol-formaldehyde molding compositions. This joint molding to shape will be applied more particularly in the cases where it is a question of obtaining colored mixed effects.

The materials thus manufactured may be used for any purposes of industries using molded articles. They are not only superior to the products of condensation of phenol-formaldehyde in appearance and fastness to light, but also possess a substantially greater resistance to alkalis than the former. Thus, in the case of a switch cover manufactured by hot pressing from a phenol-formaldehyde material, exposed to the action of the vapours of a concentrated ammonia solution for 24 hours, the megohm value of 160,000 drops down to 1200. The electrical resistance of the molded articles manufactured by the present process does not change during 24 hours, and it is only after five days' continuous exposure to ammonia vapours, that causes a drop from 160,000 to 2300 megohms, within which time and under similar conditions the resistance of a phenol-formaldehyde mass drops to 50 megohms. This superiority is of great importance in view of the constantly increasing use of molded insulating material in electrotechnics for the purpose of obtaining the greatest possible protection against contact.

The insulating property of a pressed article thus manufactured is so good that, after being left for 24 hours in water, it still shows an insulation resistance of 175,000 megohms.

*Examples*

(1) 60 parts by weight of urea (1 mol.) are dissolved in 125 parts by weight of an aqueous formaldehyde solution which contains 36 percent by weight of formaldehyde (1½ mols), whereupon 0.3 parts by weight oxalic acid are added. After a short heating, the contents of the flask become white, whereupon is added a solution of 76 parts by weight of thiourea (1 mol.) in 125 parts by weight of an aqueous 36% formaldehyde solution (1½ mols). The boiler contents already having a tendency to gelatinise, are liquefied again by the addition of the thiourea-formaldehyde solution. The reaction mixture is thereupon boiled for about 15 to 30 minutes in a reflux-boiler. On cooling, a hydrophobe white resin would be precipitated. The hot solution is then mixed with 136 parts by weight of cellulose and thoroughly kneaded in a mixing and kneading apparatus. The mixture is thereupon left to stand for 24 hours at the ordinary temperature, and then treated at 90–100° C., in a drying device with scoops. After several hours, the product is ground and submitted to further heating until the required capacity of being molded by pressing is obtained.

The molding, which is carried out at a temperature of about 140° C. on the die surface, at a specific pressure of about 200 kg. per sq. cm. takes place on a perfectly smooth manner not only in positive but also in overflow molds. After the molding it is advisable to submit the articles to an additional heat treatment for 12 to 20 hours in a kiln of 80–100° C. in a slight draft of air or under slightly reduced pressure.

In accordance with this example can be manufactured opaque molded articles, or, with additions of small quantities of white mineral color (for instance zinc oxide), white molded articles.

(2) 76 parts by weight of thiourea (1 mol.) are dissolved in 250 parts by weight of an aqueous formaldehyde solution containing 36 percent by weight of formaldehyde (3 mols). Into the boiling solution are introduced 1 to 2 parts by weight of oxalic acid, by which addition the hydrogen ion concentration is adjusted to a pH of about 3, and thereupon are introduced 60 parts by weight (1 mol.) of urea. In place of the oxalic acid quantity mentioned, could also be used a corresponding quantity of aluminium sulphate or of some other substance which gives off in the present reaction mixture the same or a similar quantity of hydrogen ions.

After a short time there will be formed from the solution which remains as clear as glass a viscous product which is mixed with 136 parts by weight of cellulose. After a thorough mixing in a kneading apparatus, the mass is first left to stand at the ordinary temperature and thereupon heated at 90–100° C. until the powder shows the required qualities for being pressed.

The product thus manufactured can be molded at a pressure of about 200 kg. per sq. cm. and at a molding temperature of about 140° C. on the die surface, to transparent molded parts of any description. It is advisable to submit the molded articles after the pressing to an additional heat treatment in a drying kiln at a temperature of 80–100° C. the material being subjected to a slight draft of air or to slightly reduced pressure, for the purpose more particularly of increasing the resistance to heat.

The pressed articles are excellent insulating materials and have a tensile strength upwards of 1000 kilograms per square centimeter (14,500 pounds per square inch).

In place of 136 parts by weight of cellulose, the same quantity of asbestos could be used in both examples without departing from the spirit of the invention. The treatment is effected in the same way. The molded articles produced in that manner are distinguished by a still greater resistance to heat and safety against ignition. In the same way, with the mixed resins could be incorporated as fibrous substance, raw cotton or, for the purpose of obtaining special effects, viscose silk or cuprammonium silk.

(3) 76 parts by weight of thiourea (1 mol) are dissolved in 250 parts by weight of an aqueous formaldehyde solution containing 36 percent by weight of formaldehyde (3 mols). To the solution are added 1 to 2 parts by weight oxalic acid and thereupon 60 parts by weight of urea (1 mol). With this solution are kneaded together in a closed mixing and kneading machine, 136 parts by weight of a fibrous substance, with simultaneous heating for about ½ to 1 hour, whereupon the mass is submitted to further treatment as described in the Examples 1 and 2.

The heat treatment of the mixtures of products of condensation fibrous substances could be effected also in such manner that the moist mixtures, after leaving the mixing and kneading apparatus, would be passed direct over heated rolls and maintained on them at 90–100° C. until they reach the required degree of polymerization. The skins thus obtained are thereupon ground and molded.

For the purpose of obtaining various partly colored effects, a phenol-formaldehyde molding mixture adapted for quick-molding can be treated jointly with a powder such as is obtained by one of the examples described in the preceding. To that end, first solid pieces are molded in the cold from the two masses, whereupon these pieces are introduced into the die utilized for the hot-pressing. In that way, wonderful colored molded articles are produced which have the appearance of marble and of other ornamental stones.

What I claim is:—

1. The process of making condensation products which consists in reacting with formaldehyde upon thiourea and urea in combination in an acid solution of a hydrogen ion concentration corresponding to the value pH=3, the thiourea and urea being present in equimolecular proportions and the formaldehyde being employed in a ratio of 1½ molecules to 1 molecule of each of the two other starting substances (thiourea and urea), and heating the mixture until there is effected the formation of a hydrophobe mixed condensation product which separates from a sample of the reaction mixture on cooling.

2. A process of making a molding powder which comprises reacting upon urea with formaldehyde under heat in the presence of water to initiate condensation, whilst adjusting the hydrogen ion concentration of the solution by addition of an acid to a higher value than that corresponding to a pH of 5 and employing the formaldehyde in a ratio of 1½ molecules to 1 molecule of urea, adding to the hot reaction mixture a solution of an equimolecular amount of thiourea in formaldehyde, the formaldehyde being present therein in a ratio of 1½ molecules to 1 molecule of the thiourea, causing the reaction to progress by heating until a mixed condensation product has been formed which separates from a sample of the reaction mixture on cooling, but remains in solution in the heat, incorporating the hot reaction solution with fibres, and evaporating and grinding.

3. A process of making a molding powder, which comprises starting the reaction with a solution of thiourea in formaldehyde in which the formaldehyde is present in a ratio of 3 molecules formaldehyde to 1 molecule of the thiourea and the hydrogen ion concentration of which is adjusted by addition of an acid to a higher value than would correspond to a pH=5, adding urea to the said solution in a ratio of 1 molecule of urea to 1 molecule of the thiourea, causing the reaction to progress by heating until a mixed condensation product has been formed which separates from a sample of the reaction mixture on cooling, but remains in solution in the heat, incorporating the hot reaction solution with fibres, and evaporating and grinding.

4. A process of making a molding powder which comprises starting the reaction with a solution of thiourea in formaldehyde in which the formaldehyde is present in a ratio of 3 molecules to 1 molecule of the thiourea, and the hydrogen ion concentration of which has been adjusted by addition of an acid to a pH-value of 3, adding urea to the said solution in a ratio of 1 molecule of urea to 1 molecule of the thiourea, causing the reaction to progress by heating until a mixed condensation product has been formed which separates from a sample of the reaction mixture on cooling, but remains in solution in the heat, incorporating the hot reaction solution with fibres, and evaporating and grinding.

5. The process of making a molding powder which comprises impregnating a fibrous material with a solution of 1 molecule urea and 1 molecule thiourea in 3 molecules formaldehyde, the said solution being suitably acidified for establishing a higher hydrogen ion concentration than that which corresponds to a pH value of 5, and heating the so prepared fibres with agitation until a mixed resin is produced, the mass being then evaporated and ground.

6. A molding material comprising a hydrophobe acid-containing urea-thiourea-formaldehyde condensation product of two mols of urea and thiourea together, to less than four mols of formaldehyde, condensed in the presence of an aqueous liquid having a greater acidity than that corresponding to pH=5, which material is adapted for quick molding under the influence of heat.

7. A molding material comprising a hydrophobe acid-containing urea-thiourea-formaldehyde condensation product of two mols of urea and thiourea together, to less than four mols of formaldehyde, condensed in the presence of an aqueous liquid having a greater acidity than that corresponding to pH=5, which molding material contains about 5% of moisture and is adapted for quick molding under the influence of heat.

8. A molding material comprising a hydrophobe acid-containing urea-thiourea-formaldehyde condensation product of one mol. of urea, about one mol. of thiourea to less than four mols of formaldehyde, condensed in the presence of an aqueous liquid having a greater acidity than that corresponding to pH=5, which material is adapted for quick molding under the influence of heat.

9. An acid-containing hydrophobe urea-thiourea-formaldehyde condensation product which consists of a condensation product of two mols of said two ureas to about three mols of formaldehyde, condensed in the presence of an aqueous liquid having a greater acidity than that corresponding to pH=5.

10. An acid-containing hydrophobe urea-thiourea-formaldehyde condensation product which consists of a condensation product of two mols of said two ureas to about three mols of formaldehyde, the amount of the thiourea being not substantially less than the amount of urea, condensed in the presence of an aqueous liquid having a greater acidity than that corresponding to pH=5.

11. A molding composition containing acid and comprising two mols of urea and thiourea together, to less than four mols of formaldehyde, simultaneously condensed together at a greater acidity than that corresponding to pH=5.

12. In the production of a hydrophobe urea-thiourea-formaldehyde condensation product, the step of carrying out the condensation in an aqueous medium having an acidity greater than that corresponding to pH=5, and checking the formation of undesirable gelatinized hydrophile compounds from the urea and the formaldehyde, by adding a substantial amount of thiourea to the reacting mixture.

13. The method of producing thiourea-urea-formaldehyde reaction products which comprises condensing thiourea, urea and formaldehyde in an acid medium whose pH is about 3, the thiourea preventing gelation while the condensation mixture is subjected to prolonged reaction to form a highly polymerized product, and the amount of formaldehyde being less than four mols of formaldehyde to two mols of urea and thiourea together.

14. The method of producing thiourea-urea-formaldehyde products which comprises condensing one mol. of urea, about one mol. of thiourea to less than four mols of formaldehyde in an aqueous medium whose acidity is greater than that corresponding to pH=5, the thiourea preventing gelation while the condensation mixture is subjected to prolonged reaction to form a highly polymerized product.

15. A quick molding powder comprising an acid-containing hydrophobe, highly polymerized, urea-thiourea-formaldehyde condensation product, being a reaction product of 2 mols, together, of urea and thiourea, and less than 4 mols of formaldehyde, which powder yields on hot molding, products which are highly resistant to water, alkalies and acids.

16. A molding material comprising a hydrophobe acid-containing urea-thiourea-formaldehyde condensation product of two mols of urea and thiourea together, to less than four mols of formaldehyde, condensed in the presence of an aqueous liquid having a greater acidity than that corresponding to pH=5, which material is adapted for quick molding under the influence of heat.

17. A ground molding material comprising a hydrophobe acid-containing reaction product of urea and thiourea in the proportion of 2 mols together and formaldehyde in the proportion of less than 4 mols condensed in the presence of an aqueous liquid having an acidity greater than corresponding to pH=5, said material being quick-moldable under heat and pressure to provide a stable, shaped article relatively resistant to water, acids and alkalies.

KURT RIPPER.